US006380115B1

(12) United States Patent
Ishikawa et al.

(10) Patent No.: US 6,380,115 B1
(45) Date of Patent: Apr. 30, 2002

(54) HIGH-FREQUENCY DIELECTRIC CERAMIC COMPOSITION, DIELECTRIC RESONATOR, DIELECTRIC FILTER, DIELECTRIC DUPLEXER, AND COMMUNICATION APPARATUS

(75) Inventors: Tatsuya Ishikawa, Yokaichi; Hitoshi Takagi, Omihachiman; Tsutomu Tatekawa; Hiroshi Tamura, both of Otsu, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/695,893

(22) Filed: Oct. 25, 2000

(30) Foreign Application Priority Data

Oct. 25, 1999 (JP) .......................................... 11-303000
Dec. 2, 1999 (JP) .......................................... 11-343615

(51) Int. Cl.[7] ......................... C04B 35/465; H01P 7/10; H04B 1/38

(52) U.S. Cl. ................. 501/136; 333/219.1; 361/321.5; 370/276; 455/73

(58) Field of Search ...................... 501/136; 333/219.1; 361/321.5; 370/276; 455/73

(56) References Cited

U.S. PATENT DOCUMENTS 5,356,844 A * 10/1994 Hirahara et al. ............ 501/136
5,824,616 A * 10/1998 Kagata et al. .............. 501/136

* cited by examiner

*Primary Examiner*—David Brunsman
(74) *Attorney, Agent, or Firm*—Ostrolenk, Faber, Gerb & Soffen, LLP

(57) ABSTRACT

A high-frequency dielectric ceramic composition comprises a perovskite crystal phase. The composition contains a rare earth element Ln, aluminum, calcium, zinc, M and titanium wherein M is at least one of niobium and tantalum, and is represented by the formula:

$$(1-y)xCaTi_aO_{1+2a}-(1-y)(1-x)Ca(Zn_{1/3}M_{2/3})_bO_{1+2b}-yLnAl_cO_{(3+3c)/2}$$

wherein x and y represent molar ratios. The parameters x, y, (1−y)x, a, b, and c satisfy the relationships: $0.56 \leqq x \leqq 0.8$, $0.08 \leqq y \leqq 0.18$, $(1-y)x \leqq 0.65$, $0.985 \leqq a \leqq 1.05$, $0.9 \leqq b \leqq 1.02$, and $0.9 \leqq c \leqq 1.05$. Zinc may be partly replaced with magnesium. The composition is suitable for use in high-frequency devices.

20 Claims, 1 Drawing Sheet

HIGH-FREQUENCY DIELECTRIC CERAMIC COMPOSITION, DIELECTRIC RESONATOR, DIELECTRIC FILTER, DIELECTRIC DUPLEXER, AND COMMUNICATION APPARATUS

BACKGROUND OF THE INVENTION

1. Field of the Invention

The present invention relates to a high-frequency dielectric ceramic composition and to a dielectric resonator, a dielectric filter, a dielectric duplexer and a communication apparatus using the same.

2. Description of the Related Art

Dielectric ceramic components are widely used as dielectric resonators, dielectric filters and circuit board materials which are mounted in electronic devices, such as portable phones, personal radio equipment and satellite broadcasting receivers, used in high-frequency bands including microwave bands and millimeter-wave bands.

Dielectric characteristics required for these high-frequency dielectric ceramic components includes (1) a high specific dielectric constant ($\in_r$) for achieving a decrease in size of the component due to a reduction in electromagnetic wavelength in a dielectric material to $1/(\in_r)^{1/2}$, (2) a low dielectric loss, that is, a high Q value, and (3) high stability of resonant frequencies to temperature, that is, a temperature coefficient ($\tau f$) of the resonant frequency near zero (ppm/°C.).

Examples of disclosed dielectric ceramic compositions include a $Ba(Zn,Ta)O_3$-based composition (Japanese Examined Patent Application Publication No. 58-25068), a $Ba(Sn,Mg,Ta)O_3$-based composition (Japanese Examined Patent Application Publication No. 3-34164), a $(Zr,Sn)TiO_4$-based composition (Japanese Examined Patent Application Publication No. 4-59267) and $Ba_2Ti_9O_{20}$ (Japanese Unexamined Patent Application Publication No. 61-10806).

Among these, $Ba(Zn,Ta)O_3$-based and $Ba(Sn,Mg,Ta)O_3$-based compositions have significantly high Q values in a range of 150,000 to 300,000 at 1 GHz, but exhibit relatively small specific dielectric constants ($\in_r$) in a range of 24 to 30.

In contrast, the $(Zr,Sn)TiO_4$-based composition and $Ba_2Ti_9O_{20}$ exhibit relatively large specific dielectric constants ($\in_r$) in a range of 37 to 40 and large Q values in a range of 50,000 to 60,000 at 1 GHz. These materials, however, do not exhibit specific dielectric constants exceeding 40.

In recent years, more compact and low-loss electronic components have been required. However, no dielectric material having a higher specific dielectric constant ($\in_r$) and a higher Q value applicable to these electronic components has been developed.

SUMMARY OF THE INVENTION

It is an object of the present invention to provide a high-frequency dielectric ceramic composition having a specific dielectric constant ($\in_r$) as high as 40 to 60, a Q value as high as 30,000 or more at 1 GHz, and a small temperature coefficient ($\tau f$) of resonant frequency within 0±30 (ppm/°C.).

It is another object of the present invention to provide a dielectric resonator, a dielectric filter, a dielectric duplexer and a communication apparatus using the high-frequency dielectric ceramic composition.

A high-frequency dielectric ceramic composition of the present invention comprises a perovskite crystal phase and comprises a rare earth element Ln, aluminum, calcium, zinc, M, and titanium wherein M is at least one of niobium and tantalum, wherein the composition is represented by the formula:

$$(1-y)xCaTi_aO_{1+2a}-(1-y)(1-x)Ca(Zn_{1/3}M_{2/3})_bO_{1+2b}-yLnAl_cO_{(3+3c)/2}$$

wherein x and y represent molar ratios, and x, y, (1−y)x, a, b, and c satisfy the relationships: $0.56 \leqq x \leqq 0.8$, $0.08 \leqq y \leqq 0.18$, $(1-y)x \leqq 0.65$, $0.985 \leqq a \leqq 1.05$, $0.9 \leqq b \leqq 1.02$, and $0.9 \leqq c \leqq 1.05$.

The high-frequency dielectric ceramic composition may further comprises magnesium, and the composition is represented by the formula:

$$(1-y)xCaTi_aO_{1+2a}-(1-y)(1-x)Ca\ \{(Zn_{-z}Mg)_{1/3}M_{2/3}\}_bO_{1+2b}-yLnAl_cO_{(3+3c)/2}$$

wherein x and y represent molar ratios, and x, y, z, (1−y)x, a, b, and c satisfy the relationships: $0.56 \leqq x \leqq 0.8$, $0.08 \leqq y \leqq 0.18$, $0<z<1$, $(1-y)x \leqq 0.65$, $0.985 \leqq a \leqq 1.05$, $0.9 \leqq b \leqq 1.02$, and $0.9 \leqq c \leqq 1.05$.

Preferably, $\alpha \leqq 0.6$.

Preferably, the rare earth element Ln is at least one selected from neodymium, yttrium, lanthanum, samarium and praseodymium. More preferably, the rare earth element Ln is at least one selected from neodymium and lanthanum.

A dielectric resonator of the present invention comprises a dielectric ceramic component and input/output terminals, the dielectric resonator operating by electromagnetic coupling of the dielectric ceramic component with the input/output terminals, wherein the dielectric ceramic component comprises the above high-frequency dielectric ceramic composition.

A dielectric filter of the present invention comprises the above dielectric resonator and external coupling means.

A dielectric duplexer of the present invention comprises at least two dielectric filters, input/output connecting means, each connected to each of the dielectric filters, and antenna connecting means commonly connected to the dielectric filters, wherein at least one of the dielectric filters is the above-mentioned dielectric filter.

A communication apparatus of the present invention comprises the above dielectric duplexer, a transmitting circuit connected to at least one input/output connecting means of the dielectric duplexer, a receiving circuit connected to at least another input/output connecting means which is different from said at least one input/output connecting means, and an antenna connected to the antenna connecting means of the dielectric duplexer.

DESCRIPTION OF THE PREFERRED EMBODIMENTS

Figure 1:
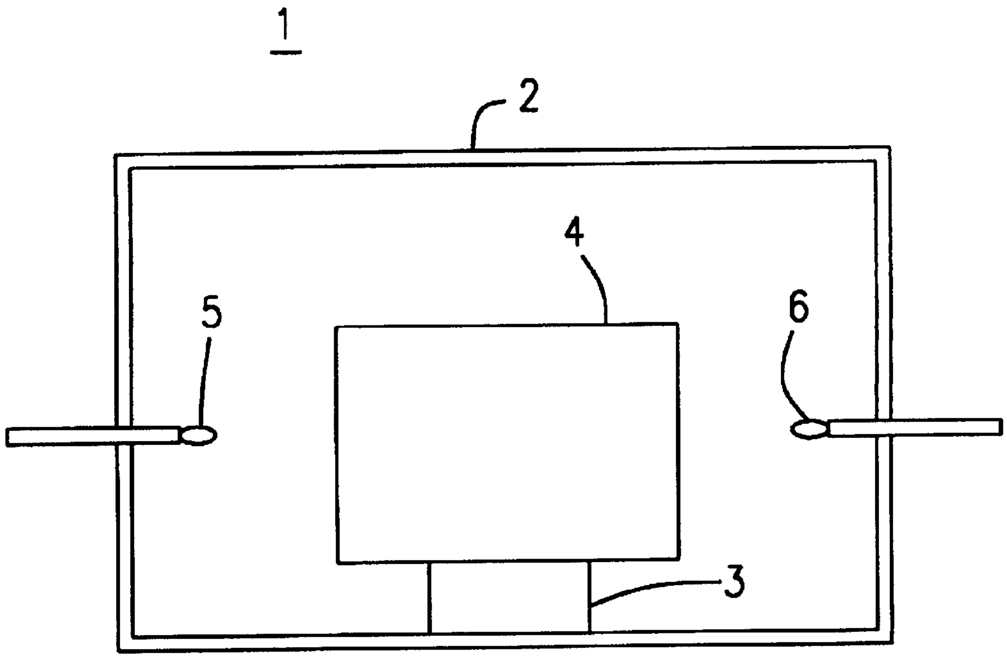
FIG. 1 is a schematic view of a basic structure of a dielectric resonator in accordance with an embodiment of the present invention.

FIG. 1 is a schematic view of a basic structure of a dielectric resonator 1 in accordance with an embodiment of the present invention. The dielectric resonator 1 is provided with a metal case 2. In the metal case 2, a pillar dielectric ceramic component 4 is supported by a susceptor 3. The dielectric resonator 1 is also provided with an input terminal 5 and an output terminal 6 which are supported by and are insulated from the metal case 2. The dielectric ceramic component 4 operates by electromagnetic coupling with the input terminal 5 and the output terminal 6. The output terminal 6 outputs signals having a predetermined frequency which is input from the input terminal 5. The dielectric ceramic component 4 of the dielectric resonator 1 is formed of the high-frequency dielectric ceramic composition in accordance with the present invention.

The dielectric resonator shown in FIG. 1 is of a TE01δ mode. The high-frequency dielectric ceramic composition of the present invention is also applicable to dielectric resonators of other TE modes, TM modes and TEM modes.

Figure 2:
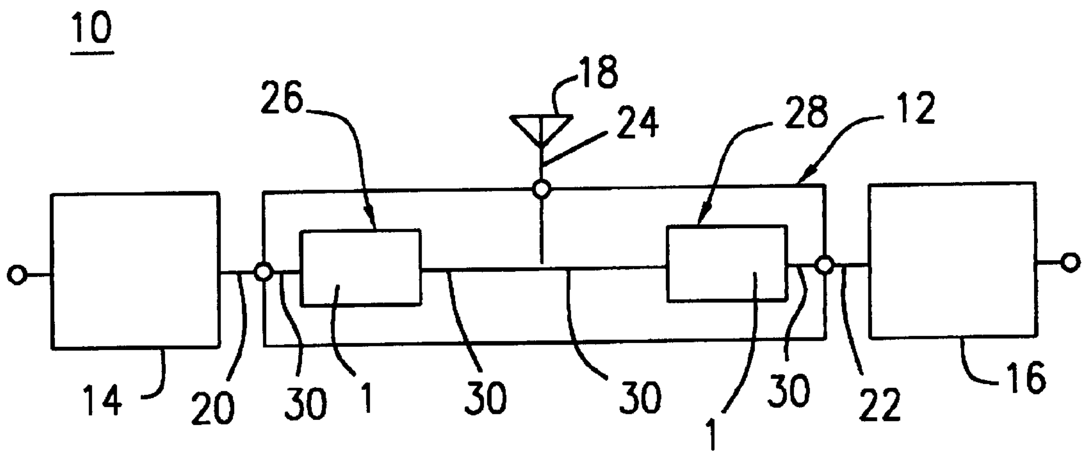
FIG. 2 is a block diagram of an embodiment of a communication apparatus in accordance with the present invention.

FIG. 2 is a block diagram of an embodiment of a communication apparatus 10 in accordance with the present invention. The communication apparatus 10 includes a dielectric duplexer 12, a transmitting circuit 14, a receiving circuit 16 and an antenna 18. The transmitting circuit 14 is connected to an input connecting means 20 of the dielectric duplexer 12, whereas the receiving circuit 16 is connected to an output connecting means 22 of the dielectric duplexer 12. The antenna 18 is connected to antenna connecting means 24 of the dielectric duplexer 12. The dielectric duplexer 12 includes two dielectric filters 26 and 28. Each of the dielectric filters 26 and 28 include the dielectric resonator 1 of the present invention and external coupling means 30. In this embodiment, the external coupling means 30 are connected to the input terminal and the output terminal of the dielectric resonator 1. The dielectric filter 26 is disposed between the input connecting means 20 and the other dielectric filter 28, whereas the other dielectric filter 28 is disposed between the dielectric filter 26 and the output connecting means 22.

The high-frequency dielectric ceramic composition in accordance with the present invention is represented by the formula $$(1-y)xCaTi_aO_{1+2a}-(1-y)(1-x)Ca(Zn_{1/3}M_{2/3})_bO_{1+2b}-yLnAl_cO_{(3+3c)/2}$$

wherein x and y represent molar ratios (hereinafter the same), and x, y, z, (1−y)x (hereinafter referred to as α), a, b, and c lie within the following ranges.

The range of x is determined to be $0.56 \leqq x \leqq 0.8$. When $x \leqq 0.56$, the Q value is less than 30,000. When $x > 0.8$, the temperature coefficient (τf) of the resonant frequency is larger than +30 ppm/°C.

The range of y is determined to be $0.08 \leqq y \leqq 0.18$. When $y < 0.08$, the Q value is less than 30,000. When y>0. 18, the Q value is also less than 30,000.

The range of α (=(1−y)x) is determined to be $\alpha \leqq 0.65$. When $\alpha > 0.65$, the temperature coefficient (τf) of the resonant frequency is larger than +30 ppm/°C. The range of $\alpha \leqq 0.6$ is preferred in order to achieve a temperature coefficient (τf) of the resonant frequency of +20 ppm/°C. or less.

The range of a is determined to be $0.985 \leqq a \leqq 1.05$. When $a < 0.985$ or $a > 1.05$, the Q value is less than 30,000.

The range of b is determined to be $0.9 \leqq b \leqq 1.02$. When $b < 0.9$ or $b > 1.02$, the Q value is less than 30,000.

The range of c is determined to be $0.9 \leqq c \leqq 1.05$. When $c < 0.9$ or $c > 1.05$, the Q value is less than 30,000.

In the high-frequency dielectric ceramic composition, zinc may be partly replaced with magnesium.

In the high-frequency dielectric ceramic composition, preferable rare earth elements Ln are neodymium, yttrium, lanthanum, samarium and praseodymium. Among these, neodymium and lanthanum are more preferable.

EXAMPLES

The present invention will now be described in more detail with reference to EXAMPLES.

Example 1

As starting materials, high-purity rear earth oxides such as $Nd_2O_3$, aluminum oxide ($Al_2O_3$), calcium carbonate ($CaCO_3$), zinc oxide (ZnO), niobium oxide ($Nb_2O_5$), tantalum oxide ($Ta_2O_5$) and titanium oxide (TiO2) were prepared. These starting materials were compounded according to the formulations shown in Table 1 to prepare compositions represent by the formula $$(1-y)xCaTi_aO_{1+2a}-(1-y)(1-x)Ca(Zn_{1/3}M_{2/3})_bO_{1+2b}-yLnAl_cO_{(3+3c)/2}.$$

Also, the starting materials were compounded according to the formulations shown in Table 2 to prepare compositions represented by the formula $$0.553CaTiO_3-0.297Ca(Zn_{1/3}Nb_{2/3})O_3-0.150LnAlO_3.$$

In sample Nos. 40 to 55 in Table 2, other rare earth elements are compounded instead of neodymium shown in Table 1. These compositions correspond to the composition of sample No. 9 in Table 1.

Each compound was molded into a disk shape under a pressure of 1,000 to 2,000 kg/cm$^2$, and the disk was sintered at 1,400 to 1,600° C. for 4 to 24 hours in air to form a ceramic compact having a diameter of 10 mm and a thickness of 5 mm which comprises a perovskite crystal phase.

The specific dielectric constant ($\in_r$) and the Q value of the ceramic compact were measured at a frequency of 6 to 8 GHz by a dielectric resonator method (short-circuited at both ends of a dielectric resonator), i.e., Hakki & Coleman method. This Q value was converted to the Q value at 1 GHz according to the Qxf=constant law. The temperature coefficient (τf) of the resonant frequency between 25° C. and 55° C. was determined from the TE01δ mode resonant frequencies. These results are shown in Tables 1 and 2. In Table 1, asterisked samples indicate the outside of the present invention.

As shown in Tables 1 and 2, each sample in accordance with the present invention exhibits a large specific dielectric constant ($\in_r$) and a large Q value in a microwave region.

With reference to Table 1, described are the reasons for limitation of the ranges in the composition represented by the formula $$(1-y)xCaTi_aO_{1+2a}-(1-y)(1-x)Ca(Zn_{1/3}M_{2/3})_bO_{1+2b}-yLnAlcO_{(3+3c)/2}.$$

In the case of $x < 0.56$, the Q value is less than 30,000 as in sample Nos. 5, 12, and 17, while, in the case of $x > 0.8$, the temperature coefficient (τf) of the resonant frequency is larger than +30 ppm/°C., as in sample Nos. 4 and 11. Thus, the range of x is determined to be $0.56 \leqq x \leqq 0.8$.

In the case of $y < 0.08$, the Q value is less than 30,000 as in sample No. 21. Also, in the case of $y > 0.18$, the Q value is less than 30,000 as in sample Nos. 2 and 3. Thus, the range of y is determined to be $0.08 \leqq y \leqq 0.18$.

In the case of α (=(1−y)x)>0.65, the temperature coefficient (τf) of the resonant frequency is larger than +30 ppm/°C. as in sample No. 16. Thus, the range of a is determined to be $\alpha \leqq 0.65$. In the case of $a \leqq 0.6$, the temperature coefficient (τf) of the resonant frequency can be farther reduced to +20 ppm/°C. or less.

The range of a is determined to be $0.985 \leqq a \leqq 1.05$. In the case of $a < 0.985$, the Q value is less than 30,000 as in sample No. 22. In the case of a>1.05, the Q value is also less than 30,000 as in sample No. 25.

The range of b is determined to be $0.9 \leqq b \leqq 1.020$. In the case of b<0.9, the Q value is less than 30,000 as in sample No. 26. In the case of b>1.02, the Q value is also less than 30,000 as in sample No. 29.

The range of c is determined to be $0.9 \leqq c \leqq 1.05$. In the case of c<0.9, the Q value is less than 30,000 as in sample No. 30. In the case of c>1.05, the Q value is also less than 30,000 as in sample No. 33.

As shown in comparison of sample No. 9 in Table 1 with sample Nos. 40 to 55 in Table 2, the use of neodymium and/or lanthanum as the rare earth elements (Ln) yields a larger specific dielectric constant ($\in_r$) and a larger Q value.

Example 2

As starting materials, high-purity neodymium oxide ($Nd_2O_3$), aluminum oxide ($Al_2O_3$), calcium carbonate ($CaCO_3$), zinc oxide (ZnO), magnesium oxide (MgO), niobium oxide ($Nb_2O_5$) and titanium oxide ($TiO_2$) were prepared. These starting materials were compounded according to the formulations shown in Table 3 to prepare compositions represent by the formula $$(1-y)xCaTiO_3-(1-y)(1-x)Ca\{(Zn_{1-z}Mg)_{1/3}Nb_{2/3}\}O_3-yLnAlO_3.$$

Sample Nos. 56 to 59 in Table 3 correspond to sample No. 9 in Table 1 in which zinc is partly replaced with magnesium. Sample Nos. 60 to 63 in Table 3 correspond to sample No. 15 in Table 1 in which zinc is partly replaced with magnesium.

Using these compounds, ceramic compacts comprising a perovskite crystal phase were prepared as in Example 1. The specific dielectric constant ($\in_r$), the Q value, and the temperature coefficient ($\tau f$) of the resonant frequency of each ceramic compact were measured as in Example 1. The results are shown in Table 3.

As shown in Table 3, the Q value and the temperature coefficient ($\tau f$) of the resonant frequency can be maintained at high levels by partial replacement of zinc with magnesium, even though the specific dielectric constant ($\in_r$) slightly decreases compared to the unsubstituted samples.

The high-frequency dielectric ceramic composition of the present invention may contain other components, such as $SiO_2$, $MnCO_3$, $B_2O_3$, NiO, CuO, $Li_2CO_3$, $Pb_3O_4$, $Bi_2O_3$, $V_2O_5$ and $WO_3$ in amounts of about 0.01 to 1.0 percent by weight. These components can decrease the sintering temperature by 20 to 30° C. without deterioration of the dielectric characteristics. Moreover, addition of about 1 to 3 percent by weight of $BaCO_3$ and/or $Sb_2O_3$ allows the fine balance between the specific dielectric constant ($\in_r$) and the temperature characteristics, resulting in a superior dielectric ceramic composition.

TABLE 1

$(1-y)xCaTi_aO_{1+2a}$-$(1-y)(1-x)Ca(Zn_{1/3}M_{2/3})_bO_{1+2b}$-$yNdAl_cO_{(3+3c)/2}$ based composition

| Sample No. | M | x | y | α = (1 − y)x | a | b | c | Specific Dielectric Constant ∈r | Q Value 1 GHz | Temperature Coefficient of Resonant Frequency τf (ppm/° C.) |
|---|---|---|---|---|---|---|---|---|---|---|
| *1 | Nb | 0.500 | 0.200 | 0.400 | 1.000 | 1.000 | 1.000 | 39.5 | 28500 | −43.2 |
| *2 | Nb | 0.625 | 0.200 | 0.500 | 1.000 | 1.000 | 1.000 | 43.7 | 29400 | −21.5 |
| *3 | Nb | 0.750 | 0.200 | 0.600 | 1.000 | 1.000 | 1.000 | 48.4 | 27800 | 5.2 |
| *4 | Nb | 0.875 | 0.200 | 0.700 | 1.000 | 1.000 | 1.000 | 53.6 | 30200 | 41.2 |
| *5 | Nb | 0.550 | 0.180 | 0.451 | 1.000 | 1.000 | 1.000 | 42.3 | 28500 | −31.5 |
| 6 | Nb | 0.710 | 0.180 | 0.582 | 1.000 | 1.000 | 1.000 | 47.5 | 32500 | 1.2 |
| 7 | Nb | 0.790 | 0.180 | 0.648 | 1.000 | 1.000 | 1.000 | 51.8 | 32500 | 27.2 |
| 8 | Nb | 0.600 | 0.150 | 0.510 | 1.000 | 1.000 | 1.000 | 46.6 | 37300 | −14.6 |
| 9 | Nb | 0.650 | 0.150 | 0.553 | 1.000 | 1.000 | 1.000 | 49.2 | 35500 | −2.6 |
| 10 | Nb | 0.700 | 0.150 | 0.595 | 1.000 | 1.000 | 1.000 | 50.9 | 34700 | 9.8 |
| *11 | Nb | 0.825 | 0.150 | 0.701 | 1.000 | 1.000 | 1.000 | 55.8 | 29900 | 40.1 |
| *12 | Nb | 0.500 | 0.100 | 0.450 | 1.000 | 1.000 | 1.000 | 46.5 | 28500 | −23.9 |
| 13 | Nb | 0.560 | 0.100 | 0.504 | 1.000 | 1.000 | 1.000 | 49.1 | 30900 | −9.5 |
| 14 | Nb | 0.600 | 0.100 | 0.540 | 1.000 | 1.000 | 1.000 | 51.8 | 30600 | 0.7 |
| 15 | Nb | 0.670 | 0.100 | 0.603 | 1.000 | 1.000 | 1.000 | 54.9 | 30100 | 18.5 |
| *16 | Nb | 0.780 | 0.100 | 0.702 | 1.000 | 1.000 | 1.000 | 63.2 | 26500 | 45.8 |
| *17 | Nb | 0.550 | 0.080 | 0.506 | 1.000 | 1.000 | 1.000 | 52.7 | 27800 | −3.2 |
| 18 | Nb | 0.700 | 0.080 | 0.644 | 1.000 | 1.000 | 1.000 | 58.5 | 30300 | 29.5 |
| *19 | Nb | 0.450 | 0.050 | 0.428 | 1.000 | 1.000 | 1.000 | 49.6 | 27300 | −15.5 |
| *20 | Nb | 0.550 | 0.050 | 0.523 | 1.000 | 1.000 | 1.000 | 56.0 | 26500 | 29.8 |
| *21 | Nb | 0.600 | 0.050 | 0.570 | 1.000 | 1.000 | 1.000 | 59.8 | 25400 | 53.5 |
| *22 | Nb | 0.670 | 0.100 | 0.603 | 0.980 | 1.000 | 1.000 | 54.2 | 22300 | 18.3 |
| 23 | Nb | 0.670 | 0.100 | 0.603 | 0.985 | 1.000 | 1.000 | 54.2 | 30200 | 18.3 |
| 24 | Nb | 0.670 | 0.100 | 0.603 | 1.050 | 1.000 | 1.000 | 55.0 | 30100 | 17.8 |
| *25 | Nb | 0.670 | 0.100 | 0.603 | 1.100 | 1.000 | 1.000 | 55.1 | 25600 | 18.2 |
| *26 | Nb | 0.670 | 0.100 | 0.603 | 1.000 | 0.850 | 1.000 | 54.2 | 24800 | 17.8 |
| 27 | Nb | 0.670 | 0.100 | 0.603 | 1.000 | 0.900 | 1.000 | 55.3 | 31100 | 18.9 |
| 28 | Nb | 0.670 | 0.100 | 0.603 | 1.000 | 1.020 | 1.000 | 54.9 | 30000 | 17.3 |
| *29 | Nb | 0.670 | 0.100 | 0.603 | 1.000 | 1.050 | 1.000 | 54.5 | 21300 | 18.7 |
| *30 | Nb | 0.670 | 0.100 | 0.603 | 1.000 | 1.000 | 0.850 | 54.2 | 20800 | 17.4 |
| 31 | Nb | 0.670 | 0.100 | 0.603 | 1.000 | 1.000 | 0.900 | 54.9 | 32400 | 17.9 |
| 32 | Nb | 0.670 | 0.100 | 0.603 | 1.000 | 1.000 | 1.050 | 55.0 | 30500 | 18.6 |
| *33 | Nb | 0.670 | 0.100 | 0.603 | 1.000 | 1.000 | 1.100 | 55.2 | 25300 | 18.2 |
| 34 | 0.8Nb 0.2Ta | 0.670 | 0.100 | 0.603 | 1.000 | 1.000 | 1.000 | 53.4 | 32200 | 16.5 |

TABLE 1-continued $(1-y)xCaTi_aO_{1+2a}$-$(1-y)(1-x)Ca(Zn_{1/3}M_{2/3})_bO_{1+2b}$-$yNdAl_cO_{(3+3c)/2}$ based composition

| Sample No. | M | x | y | α = (1 − y)x | a | b | c | Specific Dielectric Constant εr | Q Value 1 GHz | Temperature Coefficient of Resonant Frequency τf (ppm/° C.) |
|---|---|---|---|---|---|---|---|---|---|---|
| 35 | 0.5Nb 0.5Ta | 0.670 | 0.100 | 0.603 | 1.000 | 1.000 | 1.000 | 51.8 | 33000 | 14.8 |
| 36 | Ta | 0.670 | 0.100 | 0.603 | 1.000 | 1.000 | 1.000 | 50.2 | 34500 | 13.0 |
| 37 | 0.8Nb 0.2Ta | 0.650 | 0.150 | 0.553 | 1.000 | 1.000 | 1.000 | 47.5 | 35300 | −3.6 |
| 38 | 0.5Nb 0.5Ta | 0.650 | 0.150 | 0.553 | 1.000 | 1.000 | 1.000 | 45.9 | 36200 | −5.2 |
| 39 | Ta | 0.650 | 0.150 | 0.553 | 1.000 | 1.000 | 1.000 | 43.4 | 37500 | −7.7 |

TABLE 2

$0.553CaTiO_3$-$0.297Ca(Zn_{1/3}Nb_{2/3})O_3$-$0.150LnAlO_3$ based composition

| Sample No. | Rare Earth Element (Ln) | Specific Dielectric Constant εr | Q Value 1 GHz | Temperature Coefficient of Resonant Frequency τf (ppm/° C.) | Remarks |
|---|---|---|---|---|---|
| 40 | Y | 42.3 | 30500 | 1.5 | Corresponds to Sample No. 9 in Table 1 |
| 41 | 0.1Y 0.9Nd | 47.9 | 34300 | −2.2 | |
| 42 | 0.3Y 0.7Nd | 46.6 | 33300 | −1.4 | |
| 43 | 0.5Y 0.5Nd | 45.4 | 32500 | −0.5 | |
| 44 | La | 50.6 | 30100 | 2.4 | |
| 45 | 0.1La 0.9Nd | 50.1 | 34100 | −2.1 | |
| 46 | 0.3La 0.7Nd | 50.2 | 33300 | −1.1 | |
| 47 | 0.5La 0.5Nd | 50.3 | 32700 | −0.3 | |
| 48 | Sm | 47.8 | 34400 | −1.3 | |
| 49 | 0.1Sm 0.9Nd | 48.4 | 33600 | −2.5 | |
| 50 | 0.3Sm 0.7Nd | 48.2 | 33900 | −2.2 | |
| 51 | 0.5Sm 0.5Nd | 48.1 | 34000 | −1.9 | |
| 52 | Pr | 50.3 | 30200 | 7.4 | |
| 53 | 0.1Pr 0.9Nd | 48.7 | 34200 | −1.6 | |
| 54 | 0.3Pr 0.7Nd | 49.0 | 33400 | 0.4 | |
| 55 | 0.5Pr 0.5Nd | 49.4 | 32500 | 2.4 | |

TABLE 3

$(1-y)xCaTiO_3$-$(1-y)(1-x)Ca[(Zn_{1-z}Mg_z)_{1/3}Nb_{2/3}]O_3$-$yNdAlO_3$ based composition

| Sample No. | x | y | z | α = (1 − y)x | Specific Dielectric Constant εr | Q Value (1 GHz) | Temperature Coefficient τf (ppm/° C.) | Remarks |
|---|---|---|---|---|---|---|---|---|
| 56 | 0.650 | 0.150 | 0.1 | 0.553 | 49.0 | 35000 | −2.5 | Corresponds to Sample No. 9 in Table 1, Zn being partly replaced with Mg |
| 57 | 0.650 | 0.150 | 0.3 | 0.553 | 48.5 | 34900 | −2.2 | |
| 58 | 0.650 | 0.150 | 0.5 | 0.553 | 47.8 | 35200 | −2.1 | |
| 59 | 0.650 | 0.150 | 0.9 | 0.553 | 47.2 | 35100 | −2.0 | |
| 60 | 0.670 | 0.100 | 0.1 | 0.603 | 54.2 | 30200 | 18.0 | Corresponds to Sample No. 15 in Table 2, Zn being partly replaced with Mg |
| 61 | 0.670 | 0.100 | 0.3 | 0.603 | 53.7 | 31000 | 17.5 | |
| 62 | 0.670 | 0.100 | 0.5 | 0.603 | 52.5 | 31200 | 17.3 | |
| 63 | 0.670 | 0.100 | 0.9 | 0.603 | 51.9 | 30600 | 17.2 | |

What is claimed is:

1. A high-frequency dielectric ceramic composition comprising a perovskite crystal phase and comprising a rare earth element Ln, aluminum, calcium, zinc, M and titanium wherein M is at least one of niobium and tantalum, wherein the composition is represented by the formula:

$$(1-y)xCaTi_aO_{1+2a}-(1-y)(1-x)Ca(Zn_{1/3}M_{2/3})_bO_{1+2b}-yLnAl_cO_{(3+3c)/2}$$

wherein x and y represent molar ratios, and x, y, (1−y)x, a, b, and c satisfy the relationships:

$0.56 \leqq x \leqq 0.8$,
$0.08 \leqq y \leqq 0.18$,
$(1-y)x \leqq 0.65$,
$0.985 \leqq a \leqq 1.05$,
$0.9 \leqq b \leqq 1.02$, and
$0.9 \leqq c \leqq 1.05$.

2. A high-frequency dielectric ceramic composition according to claim 1, further comprising magnesium, wherein the composition is represented by the formula: $(1-y)xCaTi_aO_{1+2a}-(1-y)(1-x)Ca\{(Zn_{1-z}Mg_z)_{1/3}M_{2/3}\}_b O_{1+2b}-yLnAl_cO_{(3+3c)/2}$ and wherein $0<z<1$.

3. A high-frequency dielectric ceramic composition according to claim 2, wherein $(1-y)x \leqq 0.6$.

4. A high-frequency dielectric ceramic composition according to claim 3, wherein the rare earth element Ln is at least one member selected from the group consisting of neodymium, yttrium, lanthanum, samarium and praseodymium.

5. A high-frequency dielectric ceramic composition according to claim 3, wherein the rare earth element Ln is at least one of neodymium and lanthanum.

6. A dielectric resonator comprising a dielectric ceramic component electromagnetically coupled with input/output terminals, wherein the dielectric ceramic component comprises a high-frequency dielectric ceramic composition according to claim 5.

7. A dielectric filter comprising a dielectric resonator according to claim 6 in combination with external coupler.

8. A dielectric duplexer comprising:

at least two dielectric filters;

input/output connectors connected to each of the dielectric filters; and antenna connector commonly connected to the dielectric filters;

wherein at least one of the dielectric filters is a dielectric filter according to claim 7.

9. A communication apparatus comprising:

a dielectric duplexer according to claim 7;

a transmitting circuit connected to at least one input/output connector of the dielectric duplexer;

a receiving circuit connected to at least another input/output connector which is different from said at least one input/output connector; and an antenna connected to the antenna connector of the dielectric duplexer.

10. A dielectric resonator comprising a dielectric ceramic component electromagnetically coupled with input/output terminals, wherein the dielectric ceramic component comprises a high-frequency dielectric ceramic composition according to claim 2.

11. A dielectric filter comprising a dielectric resonator according to claim 10 in combination with external coupler.

12. A dielectric duplexer comprising:

at least two dielectric filters;

input/output connectors connected to each of the dielectric filters; and antenna connector commonly connected to the dielectric filters;

wherein at least one of the dielectric filters is a dielectric filter according to claim 11.

13. A communication apparatus comprising:

a dielectric duplexer according to claim 12;

a transmitting circuit connected to at least one input/output connector of the dielectric duplexer;

a receiving circuit connected to at least another input/output connector which is different from said at least one input/output connector; and an antenna connected to the antenna connector of the dielectric duplexer.

14. A high-frequency dielectric ceramic composition according to claim 1, wherein $(1-y)x \leqq 0.6$.

15. A high-frequency dielectric ceramic composition according to claim 14, wherein the rare earth element Ln is at least one member selected from the group consisting of neodymium, yttrium, lanthanum, samarium and praseodymium.

16. A high-frequency dielectric ceramic composition according to claim 14, wherein the rare earth element Ln is at least one of neodymium and lanthanum.

17. A dielectric resonator comprising a dielectric ceramic component electromagnetically coupled with input/output terminals, wherein the dielectric ceramic component comprises a high-frequency dielectric ceramic composition according to claim 1.

18. A dielectric filter comprising a dielectric resonator according to claim 17 in combination with external coupler.

19. A dielectric duplexer comprising:

at least two dielectric filters;

input/output connectors connected to each of the dielectric filters; and antenna connector commonly connected to the dielectric filters;

wherein at least one of the dielectric filters is a dielectric filter according to claim 18.

20. A communication apparatus comprising:

a dielectric duplexer according to claim 19;

a transmitting circuit connected to at least one input/output connector of the dielectric duplexer;

a receiving circuit connected to at least another input/output connector which is different from said at least one input/output connector; and an antenna connected to the antenna connector of the dielectric duplexer.

* * * * *